US006666010B2

(12) United States Patent
Beaufort et al.

(10) Patent No.: US 6,666,010 B2
(45) Date of Patent: Dec. 23, 2003

(54) TOWED FARM MACHINE

(75) Inventors: David Beaufort, Gray (FR); Damien Faivre, Apremont (FR); Heinrich Tepe, Gray la Ville (FR); Matthew Mentzer, Ottumwa, IA (US)

(73) Assignee: Deere & Company, Moline, IL (US)

( * ) Notice: Subject to any disclaimer, the term of this patent is extended or adjusted under 35 U.S.C. 154(b) by 2 days.

(21) Appl. No.: 09/879,644

(22) Filed: Jun. 12, 2001

(65) Prior Publication Data

US 2002/0043060 A1 Apr. 18, 2002

(30) Foreign Application Priority Data

Jun. 15, 2000 (DE) .......................................... 100 29 363

(51) Int. Cl.⁷ ............................................... A01B 73/00
(52) U.S. Cl. ...................... 56/228; 172/395; 280/47.12
(58) Field of Search ................. 172/245, 254, 172/310, 311, 324, 395, 452, 605, 669; 56/208, 228; 280/47.12, 47.16, 763.1, 767, 475, 414.5

(56) References Cited

U.S. PATENT DOCUMENTS

| | | | | |
|---|---|---|---|---|
| 2,833,105 A | * | 5/1958 | Naery ........................ | 56/228 |
| 3,190,674 A | * | 6/1965 | Carter ........................ | 280/150 |
| 3,610,661 A | * | 10/1971 | Pierce et al. ................ | 172/240 |
| 3,651,870 A | * | 3/1972 | Calkins ...................... | 172/311 |
| 3,913,683 A | * | 10/1975 | Olsson et al. ................ | 56/228 |
| 4,063,745 A | * | 12/1977 | Olson ........................ | 280/43.23 |
| 4,117,893 A | * | 10/1978 | Kinzenbaw .................. | 172/311 |
| 4,127,283 A | * | 11/1978 | Baden ........................ | 172/310 |
| 4,318,656 A | * | 3/1982 | Ezell ......................... | 280/677 |
| 4,377,979 A | * | 3/1983 | Peterson et al. .............. | 111/52 |
| 4,506,609 A | * | 3/1985 | Fuss et al. ................... | 111/136 |
| 4,558,560 A | | 12/1985 | Koch | |
| 4,607,996 A | * | 8/1986 | Koch .......................... | 14/71.1 |
| 5,000,268 A | * | 3/1991 | Zimmerman ................. | 172/310 |
| 5,054,560 A | * | 10/1991 | Foley et al. .................. | 172/1 |
| 5,136,828 A | | 8/1992 | Ermacora | |
| 5,601,303 A | * | 2/1997 | Underwood ............. | 280/414.5 |
| 5,737,859 A | * | 4/1998 | Tardif ........................ | 172/452 |
| 5,787,988 A | * | 8/1998 | Harlan et al. ................ | 172/311 |
| 5,833,260 A | * | 11/1998 | York .......................... | 280/475 |
| 5,975,829 A | * | 11/1999 | Walters et al. ............... | 14/71.1 |
| 6,076,613 A | * | 6/2000 | Frasier ....................... | 172/311 |
| 6,152,240 A | * | 11/2000 | Nonhoff et al. .............. | 172/311 |
| 6,360,516 B1 | * | 3/2002 | Harkcom et al. ............. | 56/228 |

FOREIGN PATENT DOCUMENTS

| | | | |
|---|---|---|---|
| EP | 0628237 A1 | * | 12/1994 |
| WO | WO 88/02707 | * | 4/1988 |
| WO | WO 91/03922 | * | 4/1991 |

* cited by examiner

Primary Examiner—Robert E. Pezzuto
Assistant Examiner—Nathan Mammen

(57) ABSTRACT

A towed farm implement includes a set of auxiliary wheels mounted for elevating the implement to a height which permits the implement to be pulled over and lowered onto a transport trailer or which permits the trailer to be otherwise maneuvered to a loading position beneath the implement. Once the implement is loaded, a pivoted tongue of the implement is positioned so as to be used for the endwise transport of loaded implement. In one embodiment, the auxiliary wheels are mounted on their own lift arms for being swung vertically by an adjusting mechanism that is independent of that use to effect vertical adjustment of the ground wheels. In another embodiment, the wheel support arms of the ground wheels and the lift arms to which the auxiliary wheels are mounted are secured together for being swung by the same adjusting mechanism.

10 Claims, 3 Drawing Sheets

TOWED FARM MACHINE

FIELD OF THE INVENTION

The invention pertains to a towed farm machine, especially a mowing machine, with a frame, supported on ground wheels, that is adjustable vertically within an operating range, and having a hitch for connecting the machine to a towing vehicle to form a paired unit.

BACKGROUND OF THE INVENTION

U.S. Pat. No. 4,558,560 shows a mowing machine and a trailer for its transport. The trailer is equipped with vertically pivotable ramps, via which the mowing machine can be driven onto the trailer. Once the mowing machine is on the trailer, it is lowered so as to rest on the trailer, and a hitch between the mowing machine and a towing vehicle is pivoted in such a way that the mowing machine on the trailer can be pulled behind the towing vehicle.

U.S. Pat. No. 5,136,828 discloses a mowing machine with transport wheels that can be lowered to the ground in place of the normal wheels and can be used for pulling the mowing machine with the hitch behind the towing vehicle. This mowing machine is not drawn on a trailer but rather on the transport wheels, so that the transport wheels and their suspension must be of commensurately stable design. The weight and expense of such an integrated transport capability are considerable.

The problem fundamental to the invention is that driving backward onto the trailer requires and presumes driving skill, so that the trailer will remain fixed in place during the ascent.

SUMMARY OF THE INVENTION

According to the present invention, there is provided an improved paired towed implement and trailer arrangement for permitting the implement to be loaded on, and transported by the trailer.

An object of the invention is to provide a towed implement and trailer arrangement which does not require the usage of ramps for loading the implement onto the trailer. This is accomplished, for example, by raising the implement and positioning the trailer under it, or, alternatively, the towed implement is simply raised and towed to a position over the trailer where it is lowered onto it.

A more specific object of the invention is to provide a towed implement which is equipped with an auxiliary loading wheel arrangement which is normally elevated above the ground during field operation but which is lowered into ground engagement for raising the implement to a loading height permitting a trailer to be moved under it or permitting it to be driven to a position above the trailer.

These and other objects will become apparent from a reading of the ensuing description together with the appended drawings.

DESCRIPTION OF THE PREFERRED EMBODIMENT

Figure 1:
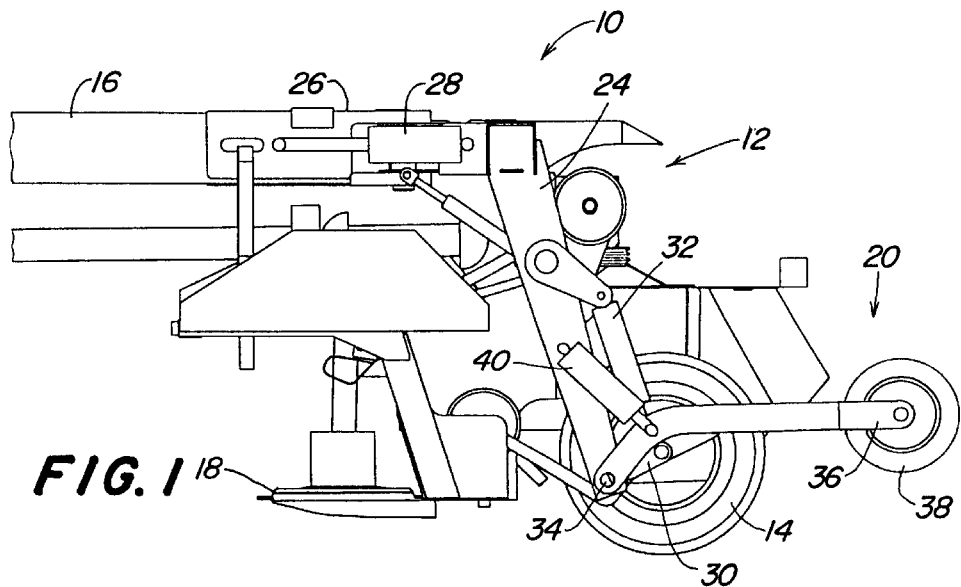
FIG. 1 is a left side elevational view showing a towed implement equipped with an auxiliary lifting wheel arrangement in accordance with the principles of the present invention, with the wheel arrangement being shown in an elevated, non-working position.
Figure 2:
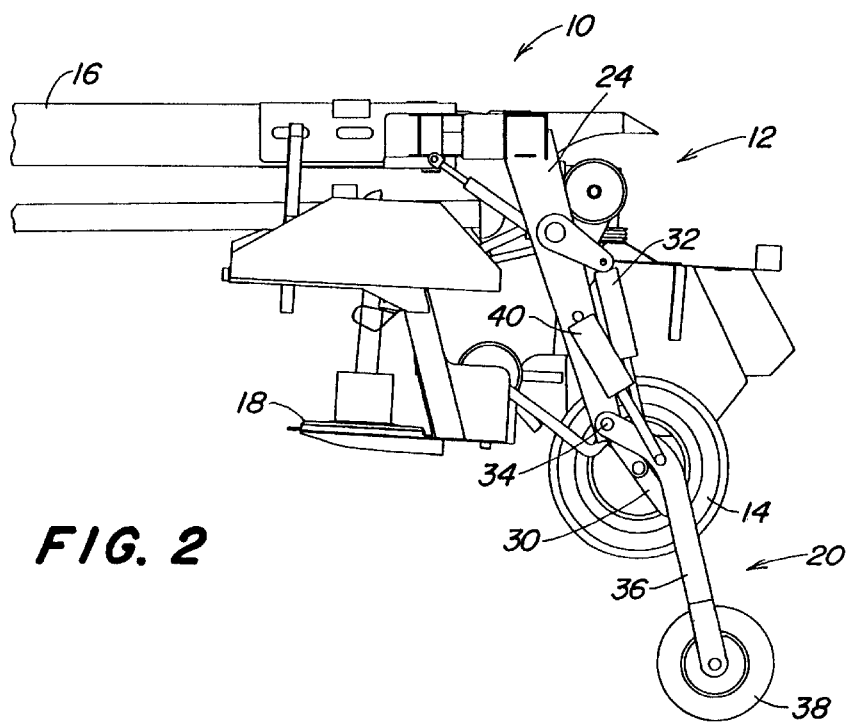
FIG. 2 is a view like FIG. 1 but showing the auxiliary wheel arrangement in a lowered, loading position.
Figure 3:
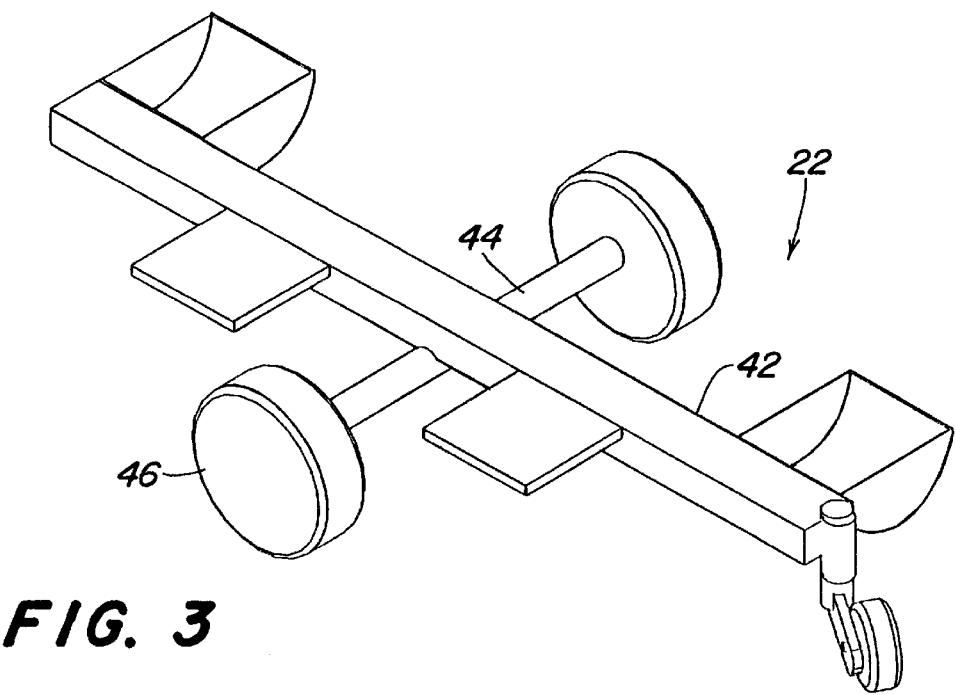
FIG. 3 is a perspective view of a trailer on which the towed implement may be placed for transport.
Figure 4:
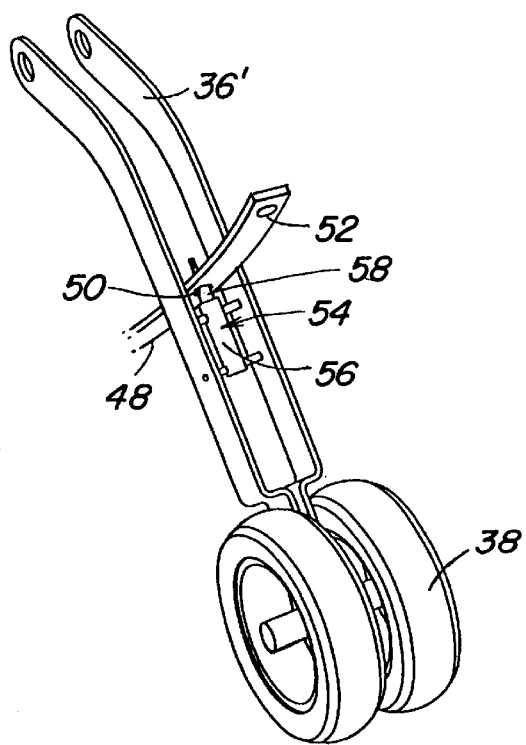
FIG. 4 is a perspective view of a swinging arm and auxiliary wheel of the auxiliary wheel arrangement and showing the associated locking bolt, which is used in a second embodiment of the auxiliary lifting wheel arrangement, locked to the wheel support arm in a lifting position.

Referring now to FIGS. 1 and 2, there is shown a towed farm implement 10 configured as a mowing machine, which is drawn over a field during its operation by an undepicted towing vehicle, e.g., an agricultural tractor, and can be transported on the roadway between periods of operation. The invention is specifically employable in the case of machines 10 that are longitudinally transportable on the roadway and have a transport width no greater than three meters. The machine 10, described below in greater detail, is adapted for being positioned on a trailer 22 (FIG. 3). The machine 10 can also be designed as a tiller/cultivator, as a planter as a harvester, or the like.

The machine 10 includes a main frame 12 supported on ground wheels 14 for being towed across a field by a draft tongue 16. When viewed in the direction of advance, the frame 12 extends over the entire width of the machine 10 and has the shape of an inverted "U", with the tools 18, e.g., a cutter bar, being supported from the frame 12 in the open space of the "U". Opposite sides of the frame 12 are defined by upright legs 24, and a wheel arm 30 is pivotally mounted to the lower end of each leg 24, as at a joint 34, for being adjusted vertically by an adjustment mechanism 32, and mounted to each wheel arm 30 is one of the wheels 14. The adjustment mechanism 32 is designed as a simply functioning hydraulic actuator, which is pivotably engaged at one end with the arm 24 and at the other end with the wheel arm 30. When the adjustment mechanism 32 is charged with hydraulic fluid or the charge is released, the wheel arm 30 pivots vertically and thus changes the position of the wheel 14 in relation to the frame 12, which results in a change of the frame's distance above the ground surface contacted by the wheels 14.

The tongue 16 represents the connection between the frame 12 and the towing vehicle, and engages the frame 12 via a joint 26 so as to be horizontally pivotable. While the joint 26 can be located on the side of the frame 12, its preferred location is in the middle of the frame. The length of the tongue 16 is dimensioned such that it projects appreciably beyond the side edge of the frame 12 when it is positioned transversely to the normal working direction of the machine 10. This permits the machine 10 to be towed endwise behind the towing vehicle by the draft tongue 16. Provided between the tongue 16 and the frame 12 is a hydraulically actuated adjustment mechanism 28 that is operated from the driver's seat of the towing vehicle. By means of such a known adjustment mechanism 28, the machine 10 can be variably positioned in relation to the towing vehicle. With regard to a possible embodiment form of the adjustment mechanism, reference may be made to U.S. Pat. No. 5,642,607, granted Jul. 1, 1997.

The tools 18 in this embodiment are configured as a cutter bar with several rotating mower blades. The position of the tools 18 during operation of the machine 10 is adapted in each case to the variable harvesting conditions. Within an operating range, the tools 18 can be progressively adjusted between a position directly on the ground and a position in which the tools assume a height above the ground, e.g., of 0.4 m.

The implement 10, thus far described, is conventional. Shown in FIGS. 1 and 2 is a first embodiment of a lift mechanism 20 comprising a swinging arm 36 and an auxiliary wheel 38 mounted to each end of the frame 12. It is the job of the lift mechanism 20 to elevate the implement 10 a sufficient distance above the ground for being loaded onto the trailer 22.

Each swinging arm 36 is designed similarly to the wheel arm 30 and is articulately joined at a lower end of the associated frame leg 24, rotationally bears the auxiliary wheel 38 at its trailing end, and is connected in between to an adjustment mechanism 40. The swinging arms 36 are connected at the joint 34 on the outside of the leg 24. Depending upon the position and the size of the wheel 14, the swinging arm 36 is laterally offset in order to achieve sufficient clearance for a vertical pivoting movement. However, such an offset can be avoided when the wheel 14 is of narrow design or is laterally offset inwardly. While not an absolute necessity, provision is made in this embodiment for the swinging arm 36 to extend to the rear appreciably beyond the wheel arm 30. The further the swinging arm 36 projects out beyond the wheel arm 30, the greater is the transport lift range achievable with it.

The auxiliary wheel 38 is made smaller than the wheel 14, since it is required only for the purpose of loading the machine 10 onto the trailer 22, and is not subjected to the stresses of rough operation in the field. Each auxiliary wheel 38 is provided as closely as possible to the projecting end of the swinging arm 36. Unlike the wheel 14, the auxiliary wheel 38 does not need not be a rubber tire but can instead be fashioned as a steel wheel. In one case, wherein the machine 10 is not driven over the trailer 22 but is merely lifted to a height above the latter, it is sufficient for the swinging arm 36 to be equipped with a foot instead of an auxiliary wheel 38, with the machine 10 then being supported on the ground by the foot.

The adjustment mechanism 40 is designed as a hydraulic actuator, which in each case is pivotably engaged at one end to the leg 24 of the frame 12, and at the other end to the swinging arm 36. In this embodiment, the adjustment mechanism 40 is double-acting, ensuring that the auxiliary wheel 38 can be pivoted far enough upward that it does not roll on the ground in an inoperative state. If this criterion does not matter, a single-acting adjustment mechanism 40 is sufficient. Alternatively, a single-acting adjustment mechanism 40 could be used that is adjusted, for example, by means of hydraulic fluid in one direction and by means of a spring or the like in the other direction. This adjustment mechanism 40, like the adjustment mechanism 28 for the wheel 14, is charged with a pressure medium by an undepicted hydraulic system comprising a pump, line, valves, and other known system components. A withdrawal or retraction of the adjustment mechanism 40 causes the swinging arm 36 of the auxiliary wheel 38 to pivot upward until the auxiliary wheel 38 lifts off the ground. An extension of the adjustment mechanism 40 results in the swinging arm 36 and the auxiliary wheel 38 being pivoted downward, or in the clockwise direction as seen in the drawing, and in fact until the wheel 14 lifts off the ground and the frame 12 achieves the required clearance above the ground.

The lift mechanism 20 is provided on each side of the frame 12, i.e., on each leg 24.

Referring now to FIG. 3, it can be seen that the trailer 22 comprises a platform 42, an axle 44 and wheels 46. The length of the platform 42 is such that on the one hand it is possible for the machine 10 to be lowered onto it, while on the other hand, it can fit between the auxiliary wheels 38. The platform, 42 is provided with various depressions, hollows, etc., that make it possible for the machine 10 to be lowered onto it such that its position does not shift during transport. Locking devices, as already known, can also be provided as necessary.

The depicted trailer 22 has only a single axle 44, equipped with two wheels 46, which is located in the middle of the platform 42. In order for the platform 42 to have an essentially horizontal orientation while the machine 10 is loaded, undepicted supports or the like can be provided. Alternatively, two axles 44 can be provided in place of the single axle 44. If the lift mechanism 20 is sufficient for an adequate lift height, the machine 10 can also be set onto the platform 42 when the latter is tilted, wherein the placement of the machine 10 will then force the platform 42 into a horizontal position. The wheels 46 are rotationally mounted on the axle 44 and are kept as small as possible in order that the lift range of the lift mechanism 20 need not be made too large.

With all of the above, the following function of the invention results.

One proceeds from the assumption that the trailer 22 is so positioned that the machine 10 can be driven onto it transversely to its longitudinal extension. Furthermore, the machine 10 is located behind a towing machine in an elevated position, in which the adjustment mechanism 32 of the wheel 14 is fully extended and the frame 12 is at the upper limit of its operating range.

In order to load the machine 10 onto the trailer 22, it must be maneuvered onto the platform 42 transversely to the longitudinal direction of the latter and the adjustment mechanism 40 is actuated such that it extends outward. As a result of the extension of the adjustment mechanism 40, the auxiliary wheels 38 touch the ground, and when the adjustment mechanism 40 extends still further, lift the frame 12 still higher. The actuation of the adjustment mechanism 40 is continued until the frame 12 or the tools 18 assume a position above the ground corresponding to the maximal height of the trailer 22. Subsequently, the machine 10 is advanced still further onto the trailer 22 until the trailer 22 or its platform 42 is positioned between the auxiliary wheels 38, and the wheels 14 and/or the tools 18 are above the platform 42. Then the adjustment mechanisms 40 are released, so that the frame 12 descends until it rests on the platform 42. Then the adjustment mechanisms 40 are retracted still further until they are lifted off of the ground. In the event locking mechanisms are provided between the machine 10 and the trailer 22, they are then engaged. Finally, the adjustment mechanism 28 of the hitch 16 is actuated, so that the machine 10 together with the trailer 22 is pivoted horizontally around the joint 26 and ultimately comes to rest longitudinally behind the towing vehicle.

A second embodiment of the invention of the invention is described below, with reference to FIGS. 4 through 7.

The lift mechanism 20 according to this embodiment has a swinging arm 30' for the wheel 40, which has a curved segment 48 on its free end, i.e., the end remote from the leg 24, which, proceeding from the wheel arm 30', ranges counterclockwise through nearly 90° with a constant radius about the joint 34 between the arm 30' and the leg 24. The connection of the curved segment 48 to the remainder of the arm 30' can be in one piece as a forged part, or can be detachable by means of a bolted connection. The curved segment 48 is provided with radially extending lower and upper bored holes 50 and 52, respectively, these holes been shown only in FIG. 4. As can also be seen in FIG. 4, a further lifting arm 36' is shown connected for movement with the wheel arm 30' through the agency of a locking bolt 54, here shown inserted in the lower bored hole 50, so that the lifting arm 36' is moved together with the wheel arm 30' when the latter is swung by the adjustment mechanism 32.

The lifting arm 36' is constructed of parallel, spaced straps defining an intervening open space in which the curved segment 48 of the arm 30' fits, with the straps being on the opposite sides of the leg 24 and vertically pivotable at the joint 34.

The locking bolt 54 can be designed in the simplest form as a mechanical closure actuated, e.g., by means of a pull cable. In the illustrated embodiment, the locking bolt 54 is designed as a remotely actuated hydraulic cylinder, which is connected to an undepicted manner to a hydraulic system of the towing vehicle or the machine 10. The locking bolt 54 is located between the straps of the swinging arm 36 and includes a cylinder 56 and a piston rod 58 displaceable therein. The locking bolt 54 extends in the direction of the swinging arm 36 in such a way that the piston rod 58 moves radially towards the curved segment 48 and can therefore enter the lower or the upper bored holes 50 and 52. Accordingly, the rod 58 of the double-acting locking bolt 54 can be selectively inserted in one or the other of the opposite end portions of the curved segment 48 so as to join both swinging arms 30' and 36' positively together in different positions and thereby ensure a common movement.

Figure 5:
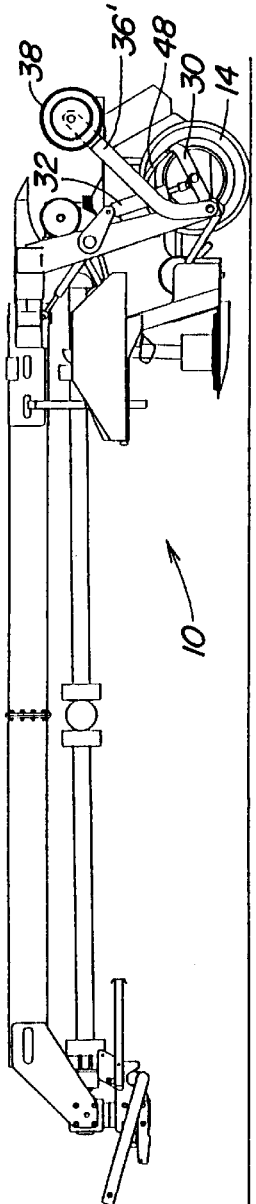
FIG. 5 is a left side elevational view of the towed implement showing the second embodiment of the auxiliary lifting wheel arrangement in a first locked, raised inoperative position.

The illustrations in FIGS. 5 through 7 will now be discussed. In the configuration depicted in FIG. 5, the locking bolt piston 58 is located in the upper bored hole 52 and, because the swinging arm 30' is in an upper position, the swinging arm 36' is also in an upper position, in which the auxiliary wheel 38 does not touch the ground. In this configuration, the machine 10 can be operated in the field.

Figure 6:
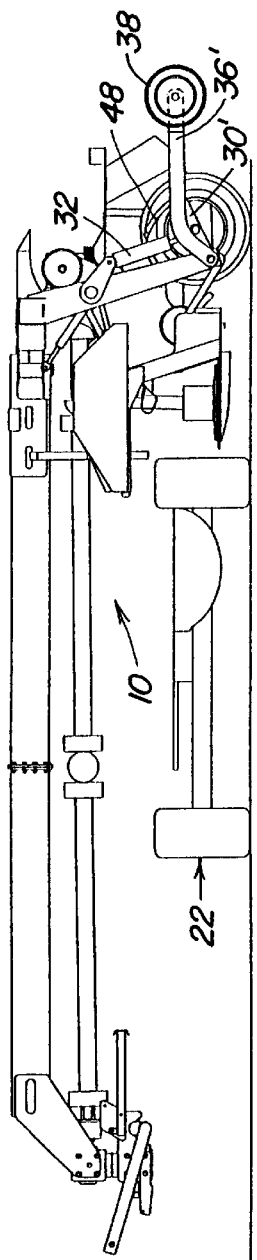
FIG. 6 is a view like FIG. 5 but showing the auxiliary lifting wheel arrangement in the second locked lifting position shown in FIG. 4, but disposed above the ground.
Figure 7:
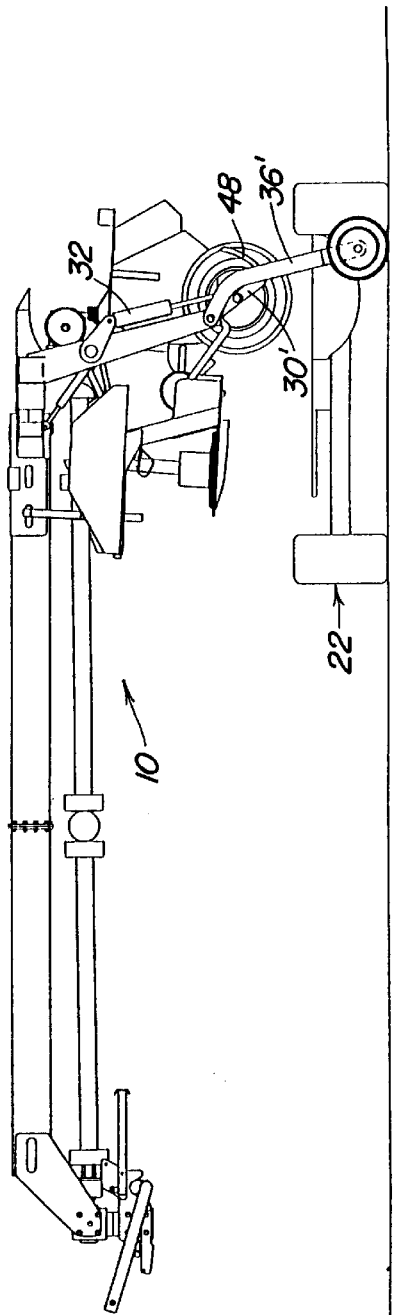
FIG. 7 is a view like FIG. 6 but showing the auxiliary lifting wheel arrangement in a lowered position supporting the implement above the ground.

In the configuration depicted in FIG. 6, the locking bolt piston 58 is located in the lower bored hole 50, but the adjustment mechanism 32 has pivoted the swinging arm 30' downward. Because, as in the first embodiment, the swinging arm 36' is appreciably longer than the wheel arm 30', the auxiliary wheel 38 describes a greater arc and comes to rest on the ground after a short movement of the swinging arm 30. When the adjustment mechanism 32 pivots the swinging arm 30 still further, the swinging arm 36' with the auxiliary wheel 38 lifts the machine 10 until the maximal adjustment reach of the adjustment mechanism 32 is reached. In this fully lifted position of the machine 10, a free space exists between the wheels 14 and the ground that is sufficient for positioning the machine 10 over the trailer 22, as depicted in FIG. 7. Because, as shown in FIG. 3, the wheels 46 of the trailer 22 are located in the middle part of the trailer, it is sufficient when the machine 10 is raised to a height in which its wheels 14 reach thee height of the platform 42.

For transport, the machine 10, as shown in FIG. 6, is driven up to the trailer 22 with a lateral offset relative to the towing vehicle, the adjustment mechanism 32 is actuated, further extension is carried out until the wheels 14 and the tool 18 are above the platform 42, the machine 10 is lowered until the auxiliary wheels 38 lift off of the ground and the hitch 16 pivots on the joint 26 until it extends in the longitudinal direction of the trailer 22 and therefore the machine 10 as well. Optionally, the machine 10 can be secured on the trailer 22 in case this should be necessary.

Having described the preferred embodiment, it will become apparent that various modifications can be made without departing from the scope of the invention as defined in the accompanying claims.

What is claimed is:

1. In a towed farm implement including an elongate main frame extending transverse to a normal working direction, a pair of wheel support arms respectively coupled to transversely spaced locations on said main frame for pivoting vertically about a transverse axis, a ground wheel mounted to each wheel support arm, an adjustment mechanism coupled between said main frame and each wheel support arm for selectively moving said arm, and hence, said main frame through an operating range, and a draft tongue coupled to the main frame for connecting the implement to a towing vehicle, the improvement comprising: said towed implement further including a lift mechanism coupled to said main frame and including at least one vertically movable ground-engaging member for selectively raising said main frame through a transport lift range in addition to said operating range; said lift mechanism including each of said wheel support arms; said at least one ground-engaging member being coupled to said at least one wheel support arm for vertical movement therewith and being so located relative to the ground wheel associated with said at least one of said wheel support arms that operation of said adjustment mechanisms will first cause movement of said ground wheels against the ground so as to move said main frame through its operating range and then cause said at least one ground-engaging member to move against the ground to cause said main frame to move through said transport lift range.

2. The towed farm implement as defined in claim 1 wherein said ground-engaging member is an auxiliary wheel.

3. In a towed farm implement including an elongate main frame extending transverse to a normal working direction, a pair of wheel support arms respectively coupled to transversely spaced locations on said main frame for pivoting vertically about a transverse axis, a ground wheel mounted to each wheel support arm, an adjustment mechanism coupled between said main frame and each wheel support arm for selectively moving said arm, and hence, said main frame through an operating range, and a draft tongue coupled to the main frame for connecting the implement to a towing vehicle, the improvement comprising: said towed implement further including a lift mechanism coupled to said main frame and including at least one vertically movable ground-engaging member for selectively raising said main frame through a transport lift range in addition to said operating range; said lift mechanism including each of said wheel support arms; said at least one ground-engaging member being mounted for movement with one of said wheel support arms; a second ground-engaging member being mounted for movement with another of said wheel support arms; and said ground engaging members being so located relative to said ground wheels that selective operation of said adjustment mechanisms will first cause said ground wheels to be moved against the ground to cause the main frame to be moved through said working range and then will cause said ground-engaging members to be moved against the ground to move the frame through said transport lift range.

4. The towed farm implement defined in claim 3 wherein said ground-engaging members are each auxiliary wheels.

5. The towed farm implement defined in claim 3 wherein said ground-engaging members are each connected to said main frame by a vertically movable lift arm extending alongside a respective one of the wheel arms; and a coupling device for selectively securing each lift arm to the adjacent wheel arm in a first position relative to said adjacent wheel arm, wherein said wheel arms may be swung to move the main frame through said working range without said ground-engaging members contacting the ground, and in a second position relative to said adjacent wheel arm, wherein said wheel arms may be swung beyond the position for establishing an upper extreme of said working range of said frame so as to bring said ground-engaging members into contact with the ground so as to raise said frame through said transport lift range.

6. The towed farm implement defined in claim 5 wherein said coupling device is a locking bolt and said wheel arms each including first and second bores located for selectively receiving an associated locking bolt so as to respectively secure said lift arms in said first and second positions relative to said wheel arms.

7. The towed farm implement defined in claim 6 wherein said wheel arms each include an inner section having a first end mounted to said main frame for pivoting about said transverse axis and a second section extending arcuately about said axis, with said first section carrying a respective one of said ground wheels; said lift arms being longer than said wheel arms and having one end mounted to said main frame for pivoting about said transverse axis and having said ground-engaging member at its other end; an associated locking bolt being mounted to said lift arm so as to extend radially toward said transverse axis; and said wheel arms each including an outer second section joined to said first section outwardly of the associated ground wheel and being curved arcuately upwardly about said axis from said first section; and said first and second bores, respectively, extending radially through upper and lower locations of said second section of each of said wheel arms.

8. In a towed farm implement including an elongate main frame extending transverse to a normal working direction, a pair of wheel support arms respectively coupled to transversely spaced locations on said main frame for pivoting vertically about a transverse axis, a ground wheel mounted to each wheel support arm, an adjustment mechanism coupled between said main frame and each wheel support arm for selectively moving said arms, and hence, said main frame through an operating range, and a draft tongue coupled to the main frame for connecting the implement to a towing vehicle, the improvement comprising: said towed farm implement further including a lift mechanism including first and second lift arms mounted to said main frame respectively adjacent to, and outwardly of, said wheel support arms for pivoting vertically; first and second ground-engaging members being respectively mounted to said first and second lift arms for vertical movement therewith; a second adjusting mechanism coupled between said main frame and said first and second lift arms for moving the latter so as to bring said first and second ground-engaging members into contact with the ground so as to effect lifting of said main frame through said transport lift range.

9. The towed farm implement defined in claim 8 wherein each ground-engaging member is an auxiliary wheel.

10. In a combination of a towed implement and a trailer for the endwise transport of said towed implement, with the implement including a main frame which is elongated in a direction transverse to a normal working direction, and is supported on a pair of ground wheels carried by wheel arms that are mounted to the frame for pivoting vertically about a transverse axis, and with the trailer including a platform located at a pre-selected transport height and supported on a pair of transport wheels, the improvement comprising; said towed implement having a pair of lift arms vertically pivotally mounted to said main frame at locations spaced from each other transverse to said normal working direction; a pair of auxiliary wheels respectively mounted to said pair of lift arms; an adjusting mechanism connected between said main frame and said pair of lift arms for pivoting them such that said main frame is lifted so as to elevate said ground wheels above said transport height; and said trailer having a length sufficient for supporting said towed implement when lowered thereon after the implement and trailer are moved relative to each other so as to position the trailer beneath the implement in a direction of travel transverse to said normal working direction.

* * * * *